United States Patent
Maya et al.

[11] Patent Number: 6,144,995
[45] Date of Patent: Nov. 7, 2000

[54] DATA TRANSFER METHOD FOR LOGICAL COMPUTERS

[75] Inventors: Yuzuru Maya, Sagamihara; Akira Otsuji, Yokohama; Takeshi Shigeno, Hadano, all of Japan

[73] Assignee: Hitachi, Ltd., Tokyo, Japan

[21] Appl. No.: 09/070,841

[22] Filed: May 1, 1998

[30] Foreign Application Priority Data

May 9, 1997 [JP] Japan ................................ 9-119090

[51] Int. Cl.$^7$ .................................................... G06F 15/80
[52] U.S. Cl. .............................................. 709/213; 709/6
[58] Field of Search .............................. 709/1, 227, 204, 709/213, 102, 6; 711/205, 6, 203, 163; 712/201, 202, 28, 30, 1; 701/242, 213; 710/242, 220

[56] References Cited

U.S. PATENT DOCUMENTS

| | | | |
|---|---|---|---|
| 4,972,315 | 11/1990 | Yamasaki et al. | 712/201 |
| 5,561,809 | 10/1996 | Elko et al. | |
| 5,684,974 | 11/1997 | Onodera | 712/202 |
| 5,751,989 | 5/1998 | Harrison | 711/203 |
| 5,881,303 | 3/1999 | Hagersten et al. | 712/30 |
| 5,892,918 | 4/1999 | Isono et al. | 709/227 |
| 5,898,883 | 4/1999 | Fujii et al. | 712/28 |
| 5,923,890 | 7/1999 | Kubala et al. | 712/1 |
| 5,925,099 | 7/1999 | Futral et al. | 709/204 |
| 6,026,448 | 2/2000 | Goldrian et al. | 709/712 |

*Primary Examiner*—Meng-Ai T. An
*Assistant Examiner*—Walter Benson
*Attorney, Agent, or Firm*—Antonelli, Terry, Stout & Kraus, LLP

[57] ABSTRACT

A data transfer method for a computer system in which a computer is logically divided into a plurality of logical processing units and a logical coupling unit. A correspondence between a start of physical addresses of a memory of each logical processing units in a memory of the computer is stored in advance. If a first logical processing unit issues a write command to the logical coupling unit by designating a logical address of data, the logical coupling unit stores an identifier and the logical address of the first logical processing unit. If a second logical processing unit issues a read command of the data, a physical address of data storage corresponding to the logical address of the first logical processing unit is calculated in accordance with the identifier and the logical address of the first logical processing unit and the address correspondence. The data is read by using the calculated physical address.

7 Claims, 6 Drawing Sheets

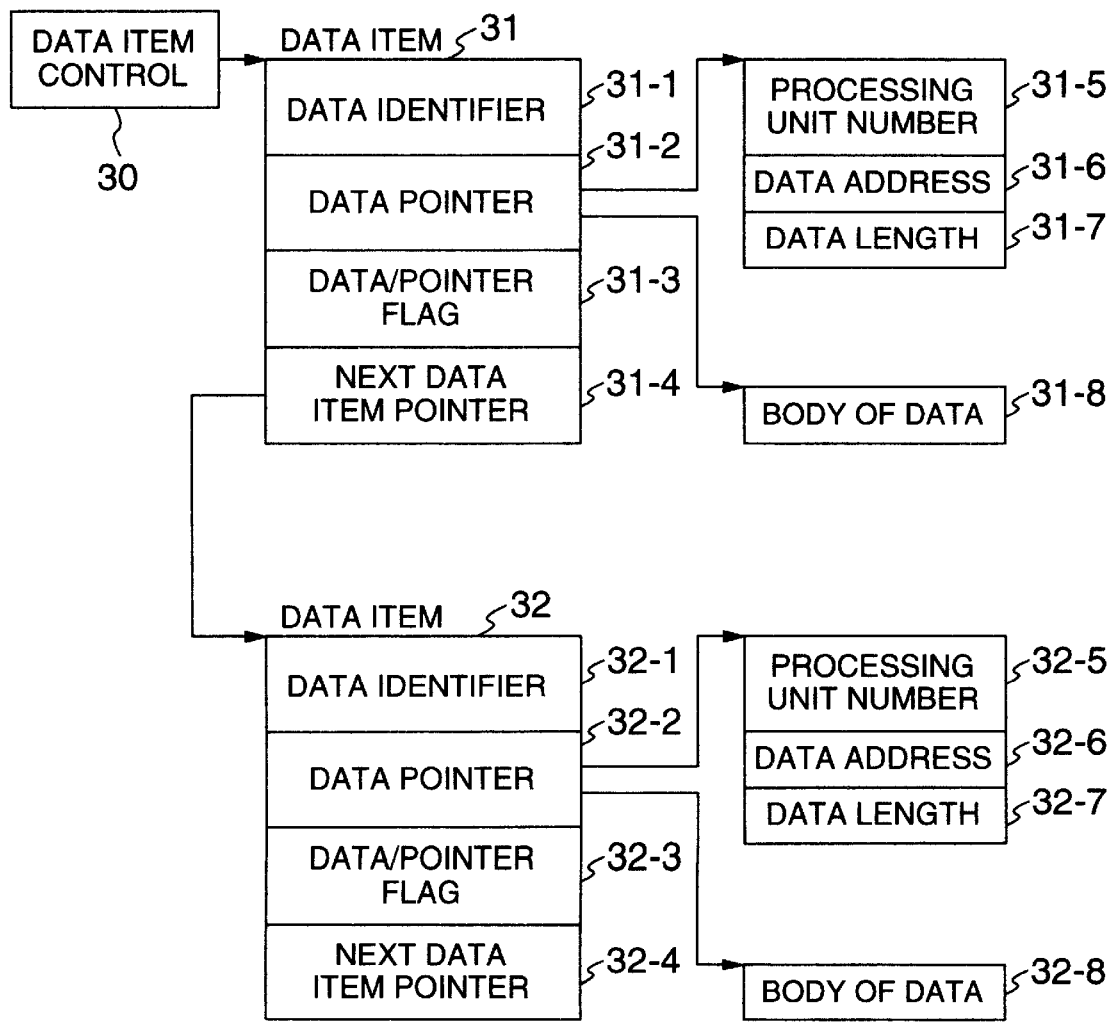

6,144,995

DATA TRANSFER METHOD FOR LOGICAL COMPUTERS

BACKGROUND OF THE INVENTION

The present invention relates to a computer system in which a computer is divided into a plurality of logical computers which constitute a logical parallel computer, and more particularly to data transfer between logical computers.

A parallel computer constituted of one or more processing units and a coupling unit shared by the processing units is disclosed in U.S. Pat. No. 5,561,809.

According to this disclosure, data write from each processing units (central processing complex: CPC) to a shared unit (structured-external-storage facility: SES facility) is performed in the following manner. First a processing unit stores data in its message buffer and transmits a write command to the coupling unit. Thereafter, the data stored in the message buffer of the processing unit is transferred to a message buffer of the coupling unit. Upon reception of the write command sent from the processing unit, the coupling unit analyzes the received command and transfers the data from the message buffer of the coupling unit to its memory. Lastly, the coupling unit returns a command processing result back to the processing unit.

When the processing unit reads data from the shared unit (SES facility), the processing unit transfers a read command to the coupling unit. Upon reception of the read command sent from the processing unit, the coupling unit analyzes the read command. The coupling unit transfers the data requested by the read command from a memory of the coupling unit to its message buffer, and transfers the data stored in its message buffer to a message buffer of the processing unit. Lastly, the coupling unit returns the command processing result and the message buffer storing the read result, back to the processing unit.

With the above method, during processing a command to be transferred from a processing unit to a coupling unit, data itself, or the body of data is transferred.

SUMMARY OF THE INVENTION

In executing a read or write command to be transferred from a processing unit to a coupling unit, data itself has been transferred between the coupling unit and processing unit, thereby posing a problem of a long data transfer time during the command processing.

According to the present invention, one computer is divided into a plurality of logical computers each being used as a logical processing unit or logical coupling unit. In this invention, a parallel logical computer is configured on a single computer and data transfer between a logical processing unit and a coupling unit is performed not by transferring data itself but by notifying an address of the data. Since the logical processing units and the logical coupling unit are configured on one computer, each logical computers can access the memory of another logical computer.

As above, according to the invention, data transfer between a logical processing unit and a coupling unit is performed by notifying an address of data. It is therefore possible to shorten a data transfer time and a command execution time.

In writing data from a processing unit to a coupling unit, the processing unit issues a write command to the coupling unit, and the processing unit transmits an address of the data to the coupling unit. The coupling unit creates the data item of the data and stores the data address in this data item.

When another processing unit reads the data, the processing unit issues a read command to the coupling unit. The coupling unit executes the received read command and notifies the data address stored in the data item to the processing unit which issued the read command. Lastly, the processing unit reads the data by using the data address received from the coupling unit.

As above, according to the invention, data itself is not transferred but only the data address is transferred during the execution of a command.

BRIEF DESCRIPTION OF THE DRAWINGS

FIG. 3 shows an address translation table.

FIG. 4 shows the data structure illustrating a data management method to be executed by a coupling unit.

DETAILED DESCRIPTION OF THE PREFERRED EMBODIMENTS

Figure 1:
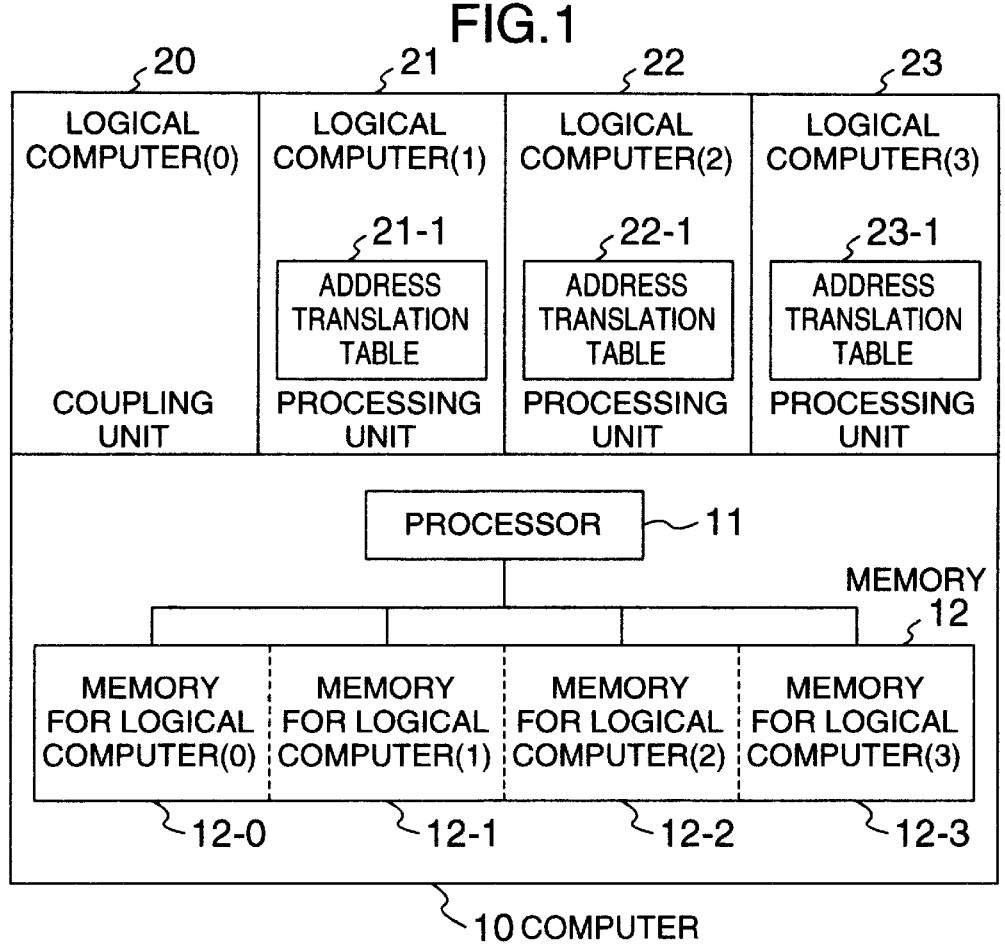
FIG. 1 is a diagram showing the structure of a logical parallel computer system of this invention.

FIG. 1 shows the structure of a logical parallel computer system according to the invention. One computer 10 is divided into a plurality of logical computers 20 to 23. The logical computer 20 is used as a coupling unit and the other computers 21 to 23 are used as processing units. Each logical processing units 21 to 23 issues a write or read command to the logical coupling unit 20 to share data stored in the coupling unit 20. In the following description, the logical processing unit 21 to 23 is simply called a processing unit, and the logical coupling unit 20 is simply called a coupling unit.

The computer 10 is constituted of a processor 11 and a memory 12. The memory 12 is divided into a memory 12-0 for the logical computer 20, a memory 12-1 for the logical computer 21, a memory 12-2 for the logical computer 22, and a memory 12-3 for the logical computer 23. Each processing units 21 to 23 generally accesses its own memory and uses a logical address. All the processing units 21 to 23 have logical addresses starting from "0" address.

Each processing units 21 to 23 accesses another processing unit by using a physical address to be later described with reference to FIG. 2. In order to know the physical address, the processing units 21 to 23 have address translation tables 21-1, 22-1 and 23-1, respectively.

Figure 2:
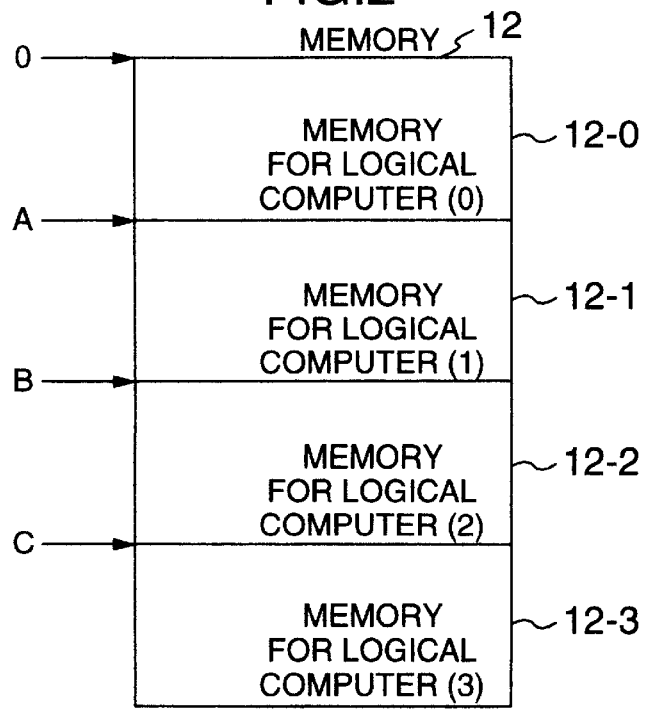
FIG. 2 is a memory map showing physical addresses.

FIG. 2 is a memory map showing physical addresses and indicates that the starts of physical addresses of the logical computers 20 to 23 are "0", "A", "B" and "C", respectively.

FIG. 3 shows the address translation table. The processing units 21 to 23 have address translation tables 21-1, 22-1 and 23-1, respectively, in order to know the starts of physical addresses of the other processing units. Each address translation tables 21-1 to 23-1 is constituted of processing unit numbers 26 and their physical start addresses 27. FIG. 3 indicates that the physical start address 27-1 of the processing unit 21 having the processing unit number 26-1 of "1" is "A", that the physical start address 27-2 of the processing unit 22 having the processing unit number 26-2 of "2" is "B", and that the physical start address 27-3 of the processing unit 23 having the processing unit number 26-3 of "3" is "C". By using this address translation table, each processing units 21 to 23 can know from the processing unit numbers 26 the starts of physical addresses of the other processing units.

FIG. 4 is a diagram illustrating a data management method to be performed by the coupling unit. In writing data, data items 31 and 32 are generated which are managed by queues. A data item control 30 is provided for each queue. The data item control 30 stores the address of the data item 31 to be connected first.

The data item 31 is constituted of a data identifier 31-1, a data pointer 31-2, a data/pointer flag 31-3 and a next data item pointer 31-4. The data item 32 also has the same fields as the data item 31.

The data identifier 31-1 identifies data of each processing units 21 to 23 and has a value unique to each processing units 21 to 23.

The data pointer 31-2 indicates the address of data. If the data/pointer flag 31-3 is "1", the data pointer 31-2 indicates the address at which the data address and data length are stored, whereas if it is "0", the data pointer 31-2 indicates the address of data itself.

The data/pointer flag 31-3 is a flag indicating whether the processing unit number, data address and data length are to be transferred or the data itself is to be transferred. If the value of this flag is "1", the processing unit number 31-5, data address 31-6 and data length 31-7 are transferred, whereas if it is "0", the data itself 31-8 is transferred. In this embodiment, because it is assumed that the processing unit number 31-5, data address 31-6 and data length 31-7 are transferred, the flag is always set to "1". However, in practice, some flag may be set to "0".

The next data item pointer 31-4 stores therein the address of the next data item 32.

Figure 5:
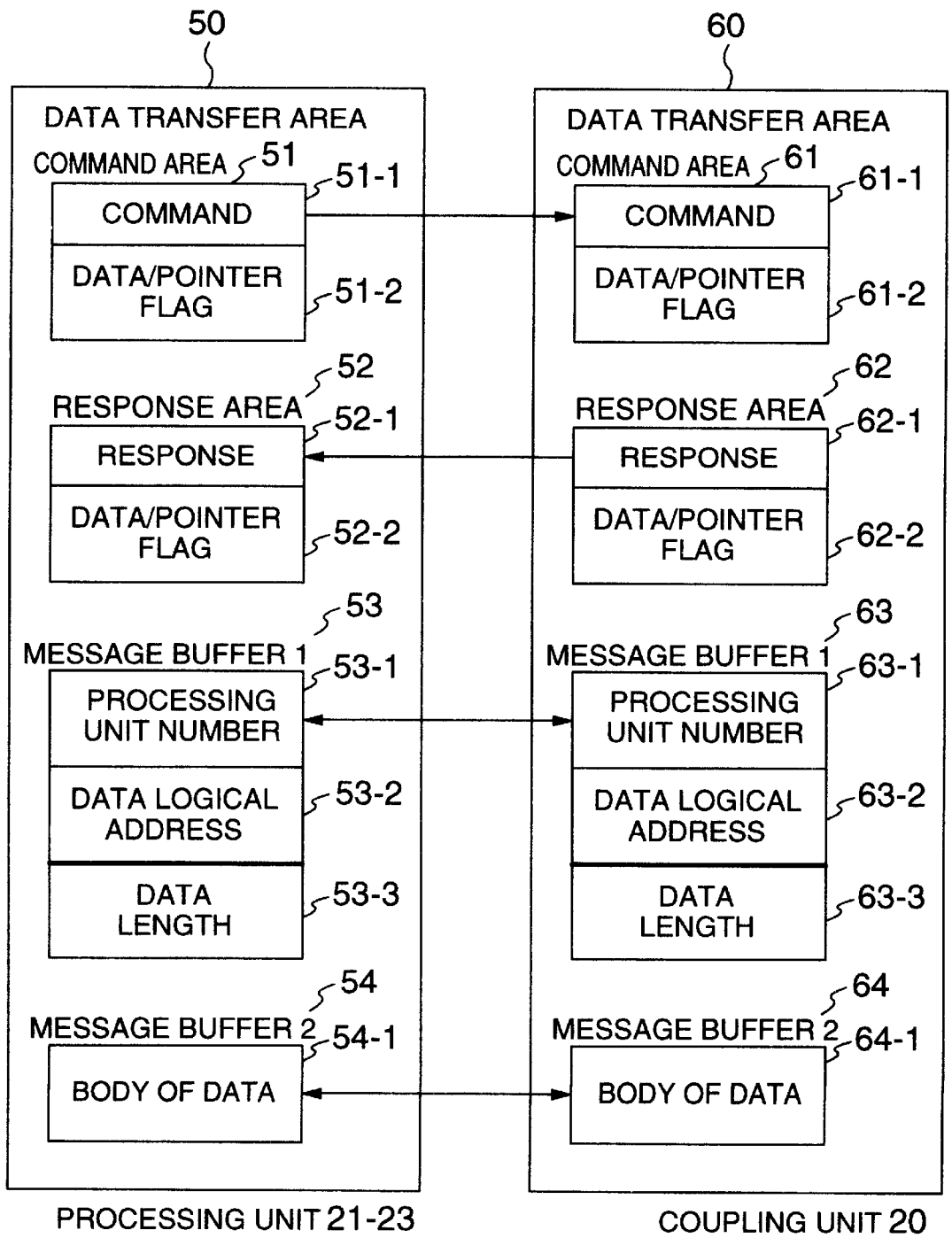
FIG. 5 shows a relation between data transfer areas of a coupling unit and a processing unit.

FIG. 5 shows data transfer areas of the coupling unit and processing unit.

A data transfer area 50 of the processing unit is constituted of a command area 51, a response area 52 and first and second message buffers 53 and 54.

The command area 51 is constituted of a command 51-1 and a data/pointer flag 51-2.

The response area 52 is constituted of a response 52-1 and a data/pointer flag 52-2.

The first message buffer 53 becomes valid when data transfer is performed by notifying the data address, and is constituted of the processing unit number 53-1, data address 53-2 and data length 53-3.

The second message buffer 54 becomes valid when data transfer is performed by using data itself, and is constituted of data itself 54-1.

A data transfer area 60 of the coupling unit has the same structure as that of the data transfer area 50 of the processing unit, and is constituted of a command area 61, a response area 62 and first and second message buffers 63 and 64.

The command area 61 is constituted of a command 61-1 and a data/pointer flag 61-2.

The response area 62 is constituted of a response 62-1 and a data/pointer flag 62-2.

Figure 6:
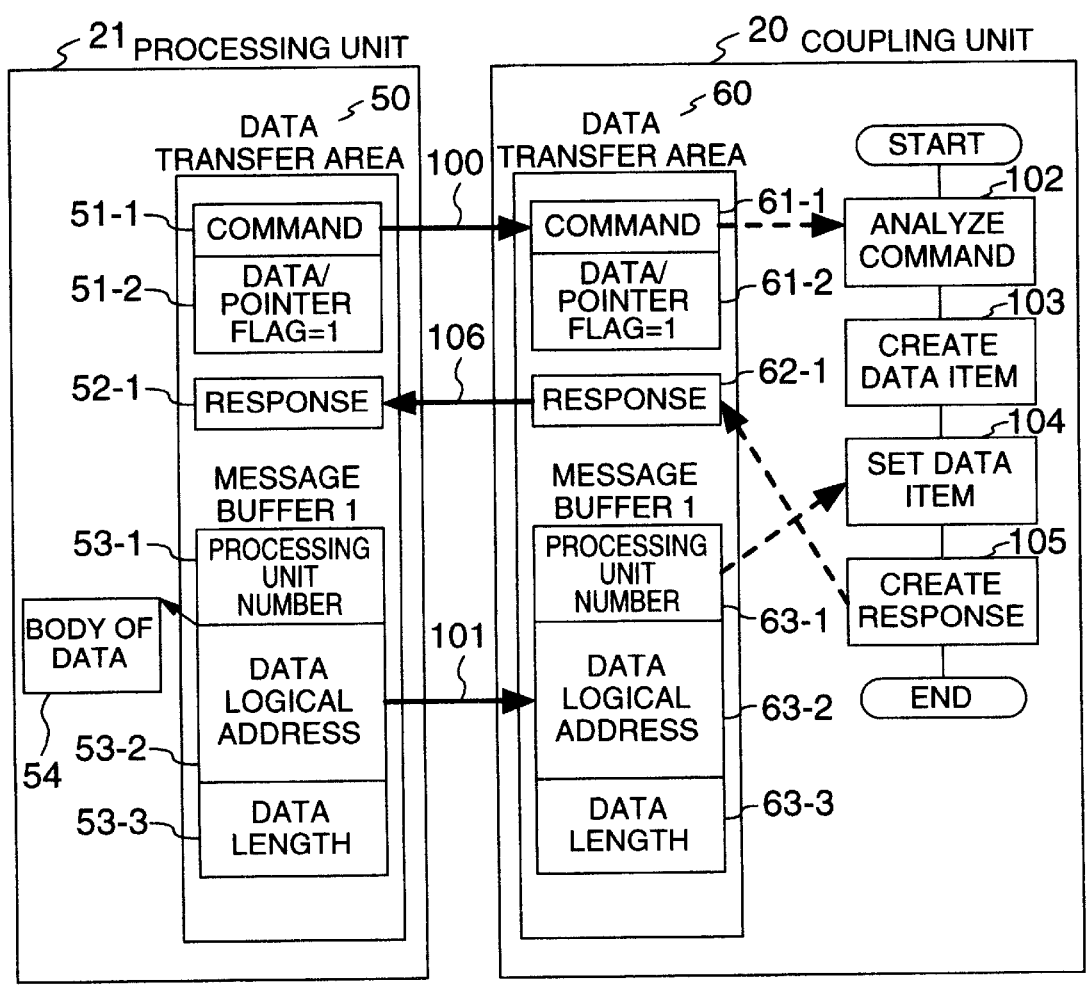
FIG. 6 is a diagram illustrating a data write process.

FIG. 6 is a flow chart illustrating a process of writing data from the processing unit 21 to the coupling unit 20. The processing unit 21 stores a write command 51-1 in the command area 51 and sets "1" to the data/pointer flag 51-2.

The processing unit 21 stores write data in the data buffer 54, sets the processing unit number 53-1 with "1" which is the processing unit number of the processing unit 21, sets the data logical address 53-2 with "a" which is a logical address of the data buffer 54, and sets the data length 53-3 with "10" which is a length of the message buffer 54. The processing unit 21 transmits the write command (Step 100) and at the same time transmits the contents of the first message buffer 53 (Step 101).

Upon reception of the write command, the coupling unit 20 reads from the data transfer area 60 the command 61-1 and data/pointer flag 61-2 to analyze the command (Step 102) and create a data item (Step 103). Next, the coupling unit 20 sets the following values to the data item 31 (Sep 104). First, the coupling unit 20 sets the unique data identifier 31-1 and connects the data item 31 to a designated position. The coupling unit 20 sets "1" to the data/pointer flag 31-3 and sets the data pointer 31-2 with an address of the field constituted of the processing unit number 31-5, data address 31-6 and data length 31-7. The processing unit number 31-5, data address 31-6 and data length 31-7 are set respectively with "1", "a" and "10" stored in the first message buffer 63. The first message buffer 63 of the coupling unit 20 stores therein copied values designated by the first message buffer 53 of the processing unit 21.

The coupling unit 20 further generates a response (Step 105) and stores it in the response area 62-1 of the data transfer area 60. Lastly, the coupling unit 20 transmits a response 62-1 to the processing unit 21 (Step 106).

Next, with reference to FIGS. 7 and 8, a process of reading written data will be described.

Figure 7:
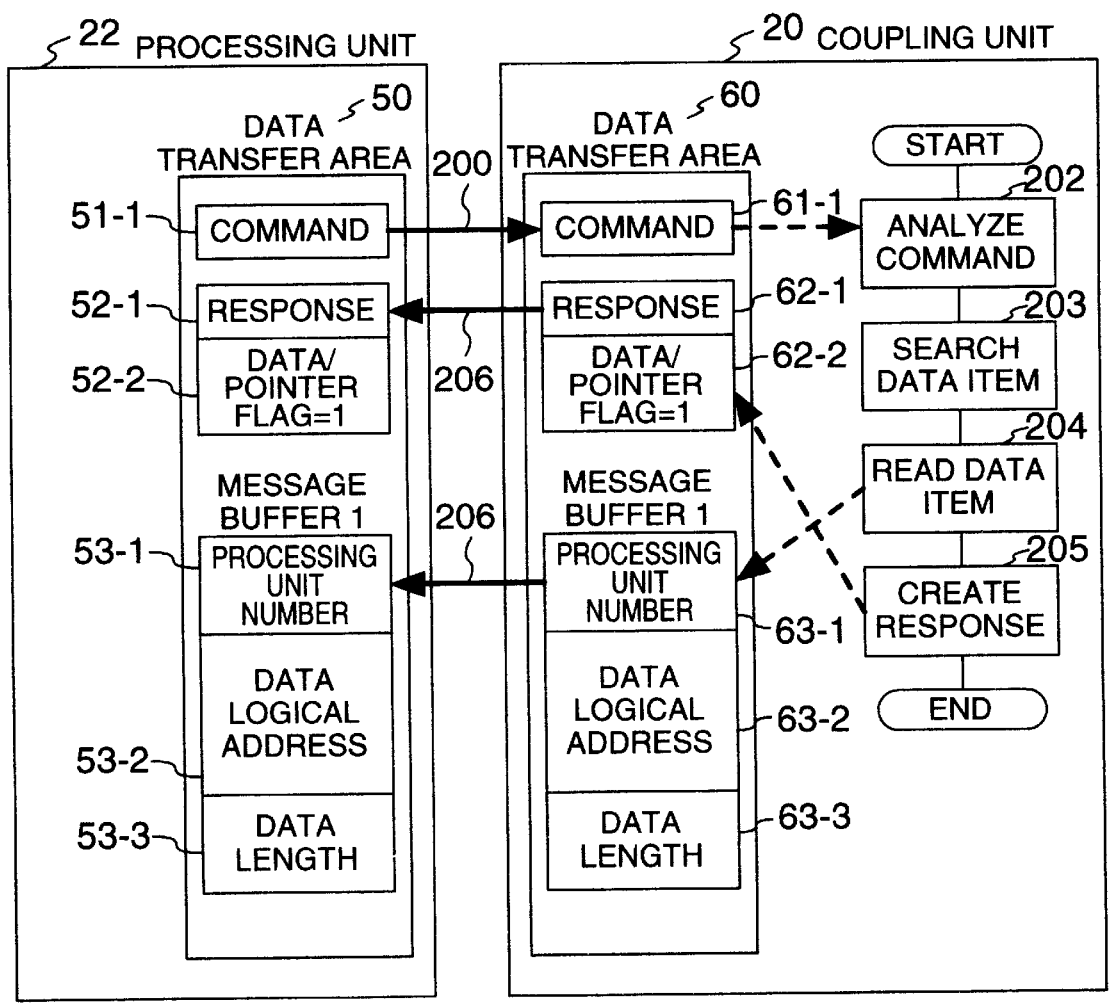
FIG. 7 is a diagram illustrating a data read process.

FIG. 7 is a diagram illustrating the process of reading data. The processing unit 22 sets a read command 51-1 and transmits it (Step 200).

Upon reception of the read command, the coupling unit 20 reads from the data transfer area 60 the command 61-1 to analyze the command (Step 202) and searches the corresponding data item 31 by using the data identifier 31-1 (Step 203). If it is judged from the searched data item 31 that the data/pointer flag 31-3 is "1", the processing unit number 63-1, data logical address 63-2 and data length 63-3 stored in the field indicated by the data pointer 31-2 are set to the first message buffer 63 (Step 204). In this embodiment, it is assumed that the processing unit number 63-1 is set with "1", the data logical address 63-2 is set with "a" and the data length 63-3 is set with "10". The coupling unit 20 further stores the response 62-1 and sets "1" to the data/pointer flag 62-2 (Step 205). Lastly, the coupling unit 20 transmits the response 62-1, data/pointer flag 62-2 and first message buffer 63 to the processing unit 22 (Step 206). The processing unit 22 therefore receives the response 52-1, data/pointer flag 52-2 of "1", processing unit number 53-1 of "1", data logical address 53-2 of "a", and data length 53-3 of "10". If it is judged from the searched data item 32 that the data/point flag 31-3 is "0", data itself is transmitted from the coupling unit 20 to the processing unit 22 as in a conventional manner.

Figure 8:
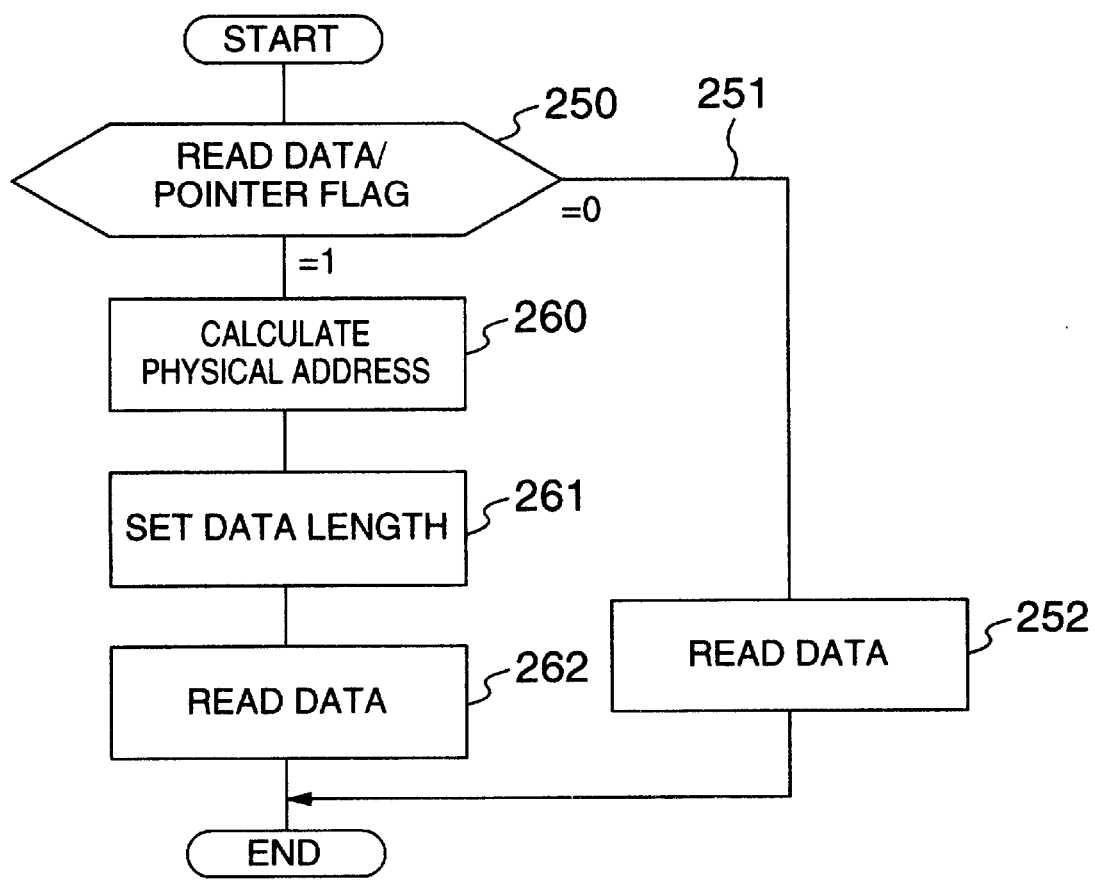
FIG. 8 is a flow chart illustrating a data read process to be executed by a processing unit.

FIG. 8 is a diagram illustrating a data read process to be executed by the processing unit.

The processing unit 22 reads the data/pointer flag 52-2 (Step 250). If the flag 25-2 is "0", it means that the data has been received. Therefore, the processing unit 22 reads the data (Step 252).

If the data/pointer flag 52-2 is "1", the processing unit 22 judges that the data pointer and data length have been received. The processing unit calculates the physical address of the data as in the following manner (Step 260). First, the processing unit 22 reads from the first message buffer 53 the processing unit number 53-1 and data logical address 53-2, and reads the address translation table 22-1. The processing unit number 53-1 is "1" and the start of physical addresses of the processing unit 21 is "A". It is assumed that the data logical address 53-2 is "a". Therefore, the start of physical addresses for the read data is "A+a". Next, the processing unit 22 reads the data length 53-3 (Step 261). The processing unit 22 sets the physical address of "A+a" and reads the data length "10" starting from this address (Step 262).

As described above, according to the invention, in the command processing, the data address and data length are transferred so that the data itself 31-7 is not necessary to be transferred and the command execution time can be shortened.

Furthermore, according to the invention, the coupling unit 20 is provided with the flag 31-3 in the data item 31, the flag 31-3 indicating whether data itself is transmitted or the processing unit number 31-5, data logical address 31-6 and data length 31-7 are transmitted. It is therefore possible to select either that the data itself 31-8 is transmitted as in a conventional manner, or that the data address and data length are transmitted as in this invention.

What is claimed is:

1. A data transfer method for a computer system in which a computer is logically divided into a plurality of logical processing units and a logical coupling unit, the method comprising the steps of:

previously storing address translation information indicating a correspondence between each of said plurality of logical processing units and a location of a memory allocated to each of said plurality of logical processing units in a memory of said computer;

issuing a write command from a first logical processing unit among said plurality of said logical processing units to said coupling unit, said write command including a data/pointer flag that indicates whether information to be transferred to a second logical processing unit, which is one of said plurality of logical processing units other than said first logical processing unit, is data to be transferred to said second logical processing unit or pointer information which is used to obtain a location of the memory in which the data to be transferred is stored;

transferring said information to be transferred to said coupling unit;

in response to said write command issued from said first logical processing unit, storing, by said coupling unit, said information to be transferred and said data/pointer flag into a data transfer area of said coupling unit;

in response to a read command issued from said second logical processing unit, transferring said information to be transferred and said data/pointer flag from said logical coupling unit to said second logical processing unit;

determining, by said second logical processing unit, whether said information to be transferred is data to be transferred or pointer information in accordance with said data/pointer flag;

calculating, if said data/pointer flag indicates that said information to be transferred is pointer information, a physical address to which the data to be transferred is stored on the basis of said pointer information and said address translation information; and reading the data to be transferred at said second logical processing unit by using the calculated physical address.

2. A data transfer method for a computer system according to claim 1, wherein said address translation information is stored in each of storage areas allocated to respective said plurality of logical processing units.

3. A data transfer method for a computer system according to claim 1, wherein said address translation information having a correspondence between an identifier of each of said plurality of logical processing units and start address of a memory area of said computer allocated to each of said plurality of logical processing units.

4. A data transfer method for a computer system according to claim 1, wherein the memory of each of said plurality of logical processing units is a divided area of the memory of said computer.

5. A data transfer method for a computer system in which a computer is logically divided into a plurality of logical processing units and a logical coupling unit, the method comprising the steps of:

issuing a write command from a first logical processing unit among said plurality of logical processing unit to said logical coupling unit, said write command including an execution instruction flag indicating whether or not data is to be transferred;

in response to said write command issued from said first logical processing unit, judging the execution instruction flag by said coupling unit;

if the execution instruction flag indicates that the data is to be transferred, transferring the data from said first logical processing unit to said logical coupling unit and storing the data into a data transfer area of said logical coupling unit; and if the execution instruction flag does not indicate that the data is to be transferred, transferring pointer information, which includes an identifier and the logical address of said first logical processing unit, from said first logical processing unit to said logical coupling unit, said storing the pointer information into a data transfer area of said logical coupling unit.

6. A data transfer method for a computer system according to claim 5, further comprising the steps of:

previously storing an address translation information indicating a correspondence between each of said plurality of logical processing units and a location of a memory allocated to each of said plurality of logical processing units in a memory of said computer;

in response to a read command for the data issued from a second logical processing unit among said plurality of logical processing units different from said first logical processing unit to said logical coupling unit, transferring the execution instruction flag and at least one of the data and the pointer information;

judging, by said second logical processing unit, the execution instruction flag;

if the execution instruction flag indicates that the data is to be transferred, transferring the data from said logical coupling unit to said second logical processing unit;

if the execution instruction flag does not indicate that the data is to be transferred, transferring the pointer information from said logical coupling unit to said second logical processing unit;

calculating, by said second logical processing unit, a physical address of a memory area to which the data is stored on the basis of the pointer information and the address translation information; and reading the data, by said second logical processing unit, by using the calculated physical address.

7. A data transfer method for a computer system in which a computer is logically divided into a plurality of logical computers, the method comprising the steps of:

- previously storing an address translation information indicating a correspondence between each of said plurality of logical computers and a location allocated to each of said plurality of logical computers in a memory of said computer;
- issuing a write command from a first logical computer among said plurality of said logical computers to said coupling unit, said write command including a data/pointer flag that indicates whether information to be transferred to a second logical computer, which is one of said plurality of logical computers other than said first logical computer, is data to be transferred to said second logical computer or pointer information which is used to obtain a location of the memory in which the data to be transferred is stored;
- transferring said information to be transferred to said coupling unit;
- in response to said write command issued from said first logical computer, storing, by said coupling unit, said information to be transferred and said data/pointer flag into a data transfer area of said coupling unit;
- in response to a read command issued from a third logical computer among said plurality of logical computers, transferring said information to be transferred and said data/pointer flag from said second logical computer to said third logical computer;
- determining, by said third logical computer, whether said information to be transferred is data to be transferred or pointer information in accordance with said data/pointer flag;
- calculating, if said data/pointer flag indicates that said information to be transferred is pointer information, a physical address to which the data to be transferred is stored based on of said pointer information and said address translation information; and
- reading the data to be transferred at said third logical processing unit by using the calculated physical address.

* * * * *